March 3, 1970

T. J. O'CONNOR  3,497,930
METHOD OF ABRASIVELY SHAPING AN ELECTRODE FOR
ELECTRIC DISCHARGE MACHINING
Filed April 27, 1966

INVENTOR.
THOMAS J. O'CONNOR
BY Whittemore,
Hulbert & Belknap
ATTORNEYS

United States Patent Office 3,497,930
Patented Mar. 3, 1970

3,497,930
METHOD OF ABRASIVELY SHAPING AN ELECTRODE FOR ELECTRIC DISCHARGE MACHINING
Thomas J. O'Connor, 100 Morgan Road,
Ann Arbor, Mich.
Filed Apr. 27, 1966, Ser. No. 545,585
Int. Cl. B24d 17/00; B24b 7/00
U.S. Cl. 29—25.18                                         5 Claims

ABSTRACT OF THE DISCLOSURE

Mechanical structure including a mirror image of an electrode to be formed, means for vibrating the mirror image of the electrode and a plurality of hard rods supported on one end on the mirror image of the electrode all of which are the same length is disclosed along with means for moving electrode material such as carbon toward the other ends of the rods during vibration of the mirror image of the electrode. The rods positioned on end on the mirror image pattern of the electrode are vibrated while the electrode material is moved toward the other end of the rods whereby mechanical abrasion of the electrode material is accomplished to produce the electrode. An air pressure differential is created across the other ends of the rods between the rods and electrode material to remove material abraded from the electrode material.

---

The invention relates to electrical discharge machining and refers more specifically to structure for and a method of producing an electrode for electrical discharge machining and securing the electrode to an electrode mounting member.

In the past electrodes for electrical discharge machining have generally been machined from solid blocks of electrode material. Such machining is tedious and wasteful of both machine time and the time of expensive mechanics, even when multiple spindle copy machines are used. In addition, the usual machining methods are not suited to rapid, accurate machining of very brittle carbon or graphite, from which many electrical discharge machining electrodes are produced, in desired configurations.

Further, in the past the mounting of carbon or graphite electrodes for electrical discharge machining to electrode mounting members has been unsatisfactory since tapped holes in the carbon or graphite are easily damaged and are limited to the weight they can successfully carry.

It is therefore an object of the present invention to provide improved structure for producing an electrode for electrical discharge machining or the like.

Another object is to provide structure for producing a carbon electrode for electrical discharge machining or the like comprising a box, a mirror image pattern of the electrode to be produced positioned in the bottom of the box, a plurality of rods one end of each of which is positioned on the bottom of the box or on the electrode pattern, means for supporting a block of electrode material over the box, means for vibrating the box and means for moving the electrode material toward the other end of the rods while the box is vibrated.

Another object is to provide an improved method of producing an electrode for electrical discharge machining or the like.

Another object is to provide an improved method of producing a graphite electrode comprising placing a mirror image pattern of the electrode to be produced on the bottom of a box, filling the box with a plurality of rods having one end positioned on the pattern or on the bottom of the box, moving a block of electrode material toward the other end of the rods and vibrating the box.

Another object is to provide improved structure for securing a graphite electrode or the like to electrode mounting structure.

Another object is to provide an improved method of securing a carbon electrode to an electrode mounting member comprising providing a reentrant recess in the electrode and filling the recess in the electrode with metal having an internally threaded insert therein for receiving a mounting bolt and securing the insert to the electrode mounting member with a mounting bolt.

Another object is to provide an improved structure for and method of producing an electrode of carbon or graphite or the like for electrical discharge machining and securing the electrode to electrode mounting structure which is simple, economical and efficient.

Other objects and features of the invention will become apparent as the description proceeds, especially when taken in conjunction with the accompanying drawings, illustrating a preferred embodiment of the invention, wherein.

With particular reference to the figures of the drawings, one embodiment of the present invention will now be disclosed in detail.

Figure 1:
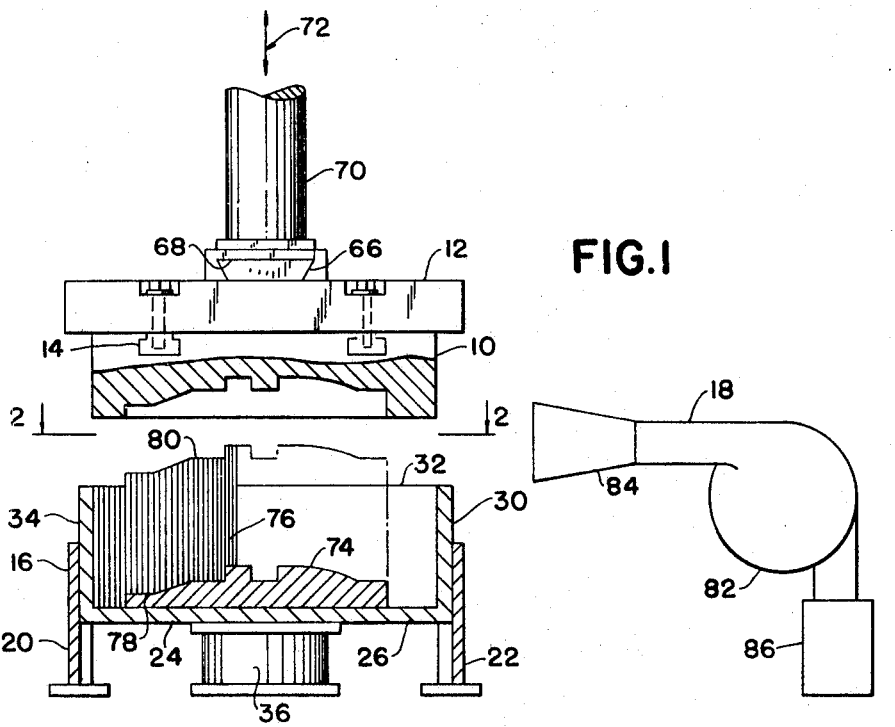
FIGURE 1 is a partial elevation view, partial section view of structure for producing a graphite or carbon electrode for electrical discharge machining.
Figure 2:
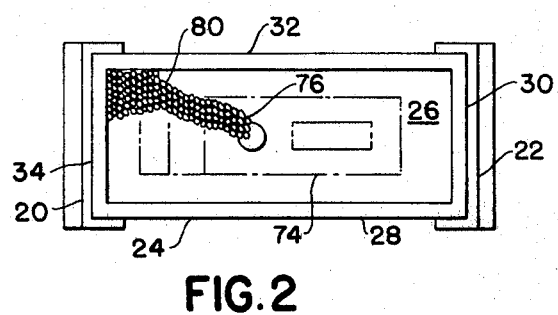
FIGURE 2 is a view of the structure illustrated in FIGURE 1 taken substantially on the line 2—2 in FIGURE 1.

As shown best in FIGURE 1 a block 10 of graphite or carbon or similar electrical discharge machining electrode material is secured to electrode supporting structure 12 by the connecting structure 14 over the electrode forming structure 16. Vacuum structure 18 is positioned adjacent the electrode material 10 and the electrode forming structure 16 to provide a pressure differential thereacross.

In operation, as the electrode material 10 is moved toward the electrode forming structure 16 and the electrode forming structure 16 is vibrated, the electrode material 10 is shaped to provide a desired electrode form. The dust or chips removed from the electrode material 10 to form the desired electrode is drawn into the vacuum structure 18 to facilitate cutting of the electrode material 10 and provide a clean operation.

More specifically, the electrode forming structure 16 includes guide structure 20 and 22 at the opposite ends of the box 24 for guiding the box 24 in vertical movement. Box 24 includes the bottom 26 and the four sides 28, 30, 32 and 34.

A vibrator 36 is positioned beneath the box 24 for vibrating the box 24 vertically. Vibrator 36 is a variable frequency and variable amplitude vibrator and both the frequency and amplitude are adjustable. Vibrators 36 are commercially available and will not therefore be considered in detail.

The higher the frequency and lower the amplitude of vibration of the vibrator 36 the finer the finish on the resulting electrode machined from the electrode material 10 will be. Conversely, the lower the frequency and the greater the amplitude of vibration, the coarser will be the finish of the finished electrode.

Figure 3:
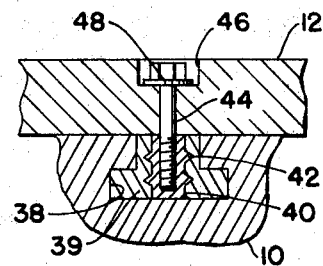
FIGURE 3 is an enlarged section view of structure for securing a graphite or carbon electrode or the like to electrode holding structure.

The structure 14 for securing the electrode material 10 and the finished electrode machined therefrom to the electrode supporting structure 12 is best shown in FIGURE 3. As shown in FIGURE 3 an inverted T-shaped slot 38 is machined across the top of the electrode material 10 and the slot is filled with metal 39, such as cast babbitt, lead or the like in which an insert 40 is secured as by external projections 42 thereon. The insert 40 is adapted to receive the threaded bolt 44. The bolt 44, as shown, is positioned in a recess 46 in the electrode supporting structure 12 and in conjunction with the washer 48 secures the electrode material 10 to the electrode supporting structure 12.

Figure 4:
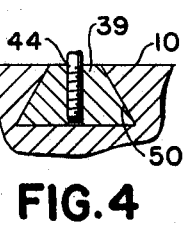

The structure 14 may be modified to provide a wedge-shaped slot 50 in the electrode material 10, as illustrated best in FIGURE 4, in place of the inverted T-shaped slot 38. The insert 40 may also be deleted, as shown in FIGURE 4, and the metal threaded directly if desired.

Figures 5, 6:
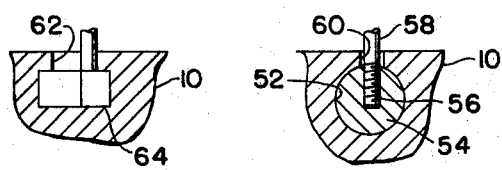
FIGURES 4 and 5 illustrate modifications of the structure illustrated in FIGURE 3.
FIGURE 6 illustrates the method of producing a further modification of the structure illustrated in FIGURES 3 through 5.

Alternatively an opening 52 may be bored transversely of the electrode material 10, as shown in FIGURE 5. A plug 54 of brass or the like is then positioned in the bore 52. The brass plug 54 is provided with a tapped opening 56 for receiving the bolt 58 through the opening 60 in the electrode material 10.

As a further alternative, and instead of machining a transverse slot in the electrode material 10, a blind opening 62 may be provided in the electrode material 10, after which the bottom of the blind hole is undercut by means of an eccentric cutting tool 64, as shown in FIGURE 6, to provide a recess which is then filled with lead or the like which may be drilled and tapped or may have an insert which is internally threaded, secured therein as before.

The electrode supporting structure 12 is provided with the dovetail portion 66 which is securely held in the dovetal recess 68 of the ram 70 of, for example, an electrical discharge machine which includes means for moving the ram up and down in the direction of arrow 72.

In overall operation of the structure 16 for forming an electrode from the electrode material 10, a mirrow image pattern 74 of the electrode to be formed is positioned on the bottom 26 of the box 24. A plurality of elongated small diameter hard rods 76 are then positioned in the box 24 to fill the box with ends 78 thereof resting on the bottom 26 of the box 24 or on pattern 74 and with the other end 80 forming a mirror image of the electrode to be formed in the material 10 adjacent the electrode material 10. The vibrator 36 is started and the ram 70 is moved so that the electrode material 10 contacts the ends 80 of the rods 76 during vibration thereof. The graphite or carbon or similar electrode material 10 is gradually dusted or chipped away as the electrode material 10 is fed downward into the rods 76 due to the vibration of the rods.

During the forming of the electrode material 10 the material which will be in the form of graphite or carbon dust or the like formed due to the disintegration of the solid block of electrode material 10 on contact with the vibrating rods 76 will be withdrawn from between the electrode material 10 and the rods 76 into the apparatus 18 for producing a pressure differential across the rods 76 and electrode material 10. The apparatus 18 may consist of a suction pump 82, a graphite collecting nozzle 84 and a graphite dust storage bin 86.

What I claim as my invention is:

1. The method of mechanically producing an electrode for an electrical discharge machine or the like comprising forming a mirror image pattern of an electrode to be produced by placing a solid mirror image pattern of the electrode to be produced on the bottom of a box and placing one end of a plurality of equal length small diameter, relatively hard rods on the solid pattern, vibrating the mirror image pattern and relatively moving the mirror image pattern and relatively easily chipped electrode material toward and into contact with each other during vibration of the pattern.

2. The method as set forth in claim 1 and further including creating a differential fluid pressure across the other ends of the rods.

3. The method as set forth in claim 1, wherein the rods are steel.

4. The method as set forth in claim 1, wherein the electrode material is carbon.

5. The method of mechanically producing an electrode for an electrical discharge machine or the like comprising forming a mirror image pattern of an electrode to be produced by placing a solid mirror image pattern of the electrode to be produced on the bottom of a box and placing one end of a plurality of equal length small diameter steel rods on the solid pattern, vibrating the mirror image pattern, moving electrode material toward and into contact with the mirror image pattern during vibration of the pattern and producing a fluid pressure differential across the other ends of the rods.

References Cited

UNITED STATES PATENTS

| | | | |
|---|---|---|---|
| 938,604 | 11/1909 | Miller | 310—249 |
| 1,188,761 | 6/1916 | Hambuchen | 310—249 |
| 1,351,059 | 8/1920 | Newbury | 310—249 |
| 2,308,860 | 1/1943 | Clark. | |
| 2,909,641 | 10/1959 | Kucyn. | |
| 2,924,701 | 2/1960 | Stamper. | |
| 1,570,177 | 1/1926 | Pointer | 51—363 |
| 2,346,975 | 4/1944 | Laboulais. | |
| 2,704,333 | 3/1955 | Calosi et al. | |
| 3,271,281 | 9/1966 | Brown et al. | |

FOREIGN PATENTS 257,468   4/1949   Switzerland.

JOSEPH V. TRUHE, Primary Examiner

R. F. STAUBLY, Assistant Examiner

U.S. Cl. X.R.

51—59, 363; 83—684; 219—69; 310—249